United States Patent [19]

Lyons

[11] 4,090,885
[45] May 23, 1978

[54] METHYL 1,1,3,3-TETRAMETHYL-BUTYL ETHER

[75] Inventor: James Edward Lyons, Wallingford, Pa.

[73] Assignee: Suntech, Inc., Wayne, Pa.

[21] Appl. No.: 801,284

[22] Filed: May 27, 1977

Related U.S. Application Data

[62] Division of Ser. No. 658,435, Feb. 17, 1976.

[51] Int. Cl.² .............................................. C09D 5/02
[52] U.S. Cl. .............................. 106/170; 106/287.23; 260/29.6 E; 260/614 A
[58] Field of Search .......... 260/614 R, 614 A, 29.6 E, 260/29.6 BE, 29.6 ME; 106/287 R, 170, 188

[56] References Cited

U.S. PATENT DOCUMENTS

| | | | |
|---|---|---|---|
| 2,956,971 | 10/1960 | Lam | 260/29.6 ME |
| 3,119,766 | 1/1964 | Voltz et al. | 260/614 A |

OTHER PUBLICATIONS

Industrial and Engineering Chemistry, vol. 28, No. 10, Tertiary Alkyl Ethers Preparations and Properties by T. W. Evans et al., pp. 1186–1188.

*Primary Examiner*—Theodore Morris
*Attorney, Agent, or Firm*—J. Edward Hess; Donald R. Johnson; Stanford M. Back

[57] ABSTRACT

The compound methyl 1,1,3,3-tetramethylbutyl ether having the formula ,0010.

1 Claim, No Drawings

METHYL 1,1,3,3-TETRAMETHYL-BUTYL ETHER

This is a division of application Ser. No. 658,435, filed Feb. 17, 1976.

BACKGROUND OF THE INVENTION

This invention relates to a novel ether, namely methyl 1,1,3,3-tetramethylbutyl ether (MTMBE), and methods for preparing the same from diisobutylene and methanol using aromatic sulfonic acids as catalysts.

Prior art patents of interest in this area are U.S. Pat. Nos. 3,119,766; 3,170,000; 3,267,156; and 3,279,385, relating to non-homologous and non-analogous alkyl ethers and their preparation. In addition, Industrial and Engineering Chemistry, Vol. 28, No. 10, p. 1186 (October, 1936), discloses the preparation of tertiary alkyl ethers having alkyl substitutes of small or moderate bulk, by the addition of low molecular weight olefins to alcohols in the presence of sulfuric acid. Under the conditions employed, it was reported that the length and bulk of the hydrocarbon chain put severe limitations on the olefin which could be used. For this reason, the use of diisobutylene was mentioned as an example of an olefin which would be unsuitable in this reaction and the report teaches away from the recovery of any product.

The MTMBE compound of this invention is useful in a variety of applications, as for example, as a low volatility industrial solvent which satisfies air pollution regulations such as the Los Angeles, Calif. "Rule 66". More particularly, this compound may be used as a solvent in lacquers, paints, inks, latex paints and as a mutual solvent for oilsoap mixtures.

MTMBE is also useful as a high octane fuel component for motor fuels, conventionally gasoline, for internal combustion engines having a high blending value. The use of ethers as high octane fuel components is shown in the art, as for example, in U.S. Pat. No. 3,119,766 (supra). When used for this purpose, the MTMBE may be used alone or have admixed therewith diisobutylene in amounts of 2 to 80% by volume based on the volume of MTMBE. The amount of said octane improver to be added to the fuel can range from about 0.5 to 5.0 percent by volume based on the total volume of the fuel.

This MTMBE compound is also effective as an antifoam agent in aqueous-organic systems in view of its emulsionbreaking characteristics.

The MTMBE is likewise effective as an anti-foam and surface smoothing agent for various types of paints, particularly latex base paints, because of its low surface tension and high volatility. The use of anti-foam and surface smoothing agents in paint formulations is reviewed, for example, in *Chemical Week*, January 28, 1976, p. 20. MTMBE has the added advantage of volatility which most paint smoothing agents do not have.

DESCRIPTION OF THE INVENTION

Methyl 1,1,3,3-tetramethylbutyl ether, having the formula

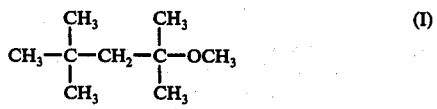

(I)

may conveniently be prepared by reaction of methanol with diisobutylene in the presence of a soluble aromatic sulfonic acid or a solid ion exchange resin catalyst such as Amberlyst 15 (Rohm and Haas, Phila.), i.e., a solid sulfonated crosslinked polymer of styrene and divinylbenzene. Sulfonic acids such as benzene sulfonic acid, methane sulfonic acid, or p-toluene sulfonic acid are also effective catalysts, of which p-toluene sulfonic acid is preferred.

When Amberlyst 15, for example is employed, the MTMBE is readily prepared by refluxing the diisobutylene and methanol together for 12 to 24 hours in the presence of the catalyst, and thereafter the ether product recovered by conventional techniques disclosed in detail in the examples below. In this process it will be understood that unreacted product may be recycled to extinction, thus providing an ultimate yield of 100%.

The diisobutylene and methanol should preferably be present in stoichiometric quantities, although an excess of either reactant may be used if desired, in a ratio of 3:1 to 1:3 by volume. The catalyst should preferably be present in amounts of 5–15% by weight based on the weight of the total reaction mixture.

The invention will now be illustrated by the following examples.

EXAMPLE I

The title compound, I, was prepared by refluxing a mixture of 50 ml of diisobutylene and 50 ml of methanol for 20 hours over 10 grams of dry Amberlyst 15 with stirring in a nitrogen atmosphere. The reaction mixture was then cooled to room temperature filtered free of Amberlyst 15 and shaken with 300 ml of water containing 20 grams of sodium carbonate. The upper phase, 50 ml, was free of methanol and gas chromatographic analysis showed it to contain two major components: diisobutylene, 80% and the product ether, I 20%. This material was mixed with 15 ml of dodecane and 5 ml of quinoline to prevent decomposition of the ether during distillation. Distillation was carried out on a semimicro spinning band column with a stainless steel band until essentially all of the diisobutylene had been removed. The material remaining in the pot was again analyzed by gas chromatography. It was shown to contain only dodecane, quinoline and the product ether. The ether, I, was distilled at atmospheric pressure away from the less volatile components of the mixture using a glass microvigeraux column. The product boiling from 146–147 (8 ml, 16% yield) was isolated and identified.

The title compound, I, was a clear colorless liquid having the following properties: b.p. 147° C (uncorr.), $n_D^{20} = 1.4158$, $S(28°) = 22$ dynes/cm using a Fisher Tensiomat. The structure of I was determined to be methyl-1,1,3,3-tetramethylbutyl ether by a combination of elemental analysis and ir, nmr and mass spectral analysis. Elemental analysis: C:75.0% (observed); D:75.0% (calculated); H:13.7% (observed); 13.9% (calculated. Nmr analysis showed 9 protons (a) at 1.00 ± 0.05 ppm, 6 protons (b) at 1.17 ± 0.05 ppm, 2 protons (c) at 1.43 ± 0.05 ppm and 3 protons at 3.10 ± 0.05 ppm (d). This spectrum is completely consistent with the structure, I. Infrared analysis showed a very strong band characteristic of the ether group at 9.3μ, a doublet: 7.23μ(m), 7.32μ(s); characteristic of the —C(CH$_3$)$_3$ grouping and structure between 8.4 and 9.3μ characteristic of branching at the carbon α to the ether group. Mass spectral analysis shows large peaks due to mass 71 and 73 due to α—C $\dotdiv$ C bond cleavage as well as peaks due to α—C ÷ O fragmentation. The mass spectrum is completely consistent with the structure, I.

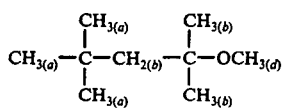

EXAMPLE 2

The procedures of Example 1 were repeated except that after the 24 hour period at reflux the mixture was allowed to stir for two weeks at room temperature. After neutralization as in Example 1, gas chromatographic analysis showed that diisobutylene was converted to compound I in over 95% yield based on reacted diisobutylene at a conversion of 33%.

EXAMPLE 3

Compound I was prepared by warming a mixture of 50 mls of diisobutylene, 50 mls of methanol and 10 grams of p-toluene sulfonic acid at 60° C for 6 hours with stirring in a nitrogen atmosphere. The resulting solution was neutralized and analyzed as described in Example 1. The conversion of diisobutylene was 23%. The yield based on converted diisobutylene was > 98%.

EXAMPLE 4

The procedures of Example 3 were repeated except after the 6 hour period at 60° C the solution was allowed to stir two weeks at room temperature. After neutralization, gc analysis showed conversion of diisobutylene to be 35% and the yield of compound I > 98%.

EXAMPLE 5

According to the procedures of Example 4, but using a mixture of 50 mls of diisobutylene, 150 mls methanol, and 20 grams of p-toluene sulfonic acid, the final analysis showed conversion of diisobutylene to be 29% and the yield of compound I > 98%.

EXAMPLE 6

According to the procedures of Example 4, but using a mixture of 200 mls diisobutylene, 75 mls methanol and 27.5 grams of p-toluene sulfonic acid, the final analysis showed conversion of diisobutylene to be 29% and the yield of compound I > 98%.

EXAMPLE 7

According to the procedures of Example 4, but substituting benzene sulfonic acid for p-toluene sulfonic acid, high yields of compound I are obtained.

EXAMPLE 8

According to the procedures of Example 4, but substituting methane sulfonic acid for p-toluene sulfonic acid, high yields of compound I are obtained.

The invention claimed is

1. A composition comprising a latex base paint and, as an anti-foam and surface smoothing agent therefor, an effective amount of methyl 1,1,3,3-tetramethyl-butyl ether.

* * * * *